(12) United States Patent
Boere et al.

(10) Patent No.: US 11,051,609 B2
(45) Date of Patent: Jul. 6, 2021

(54) METHODS AND SYSTEMS FOR OPTICAL SENSING OF FORCES IN A TOOTHBRUSH

(71) Applicant: KONINKLIJKE PHILIPS N.V., Eindhoven (NL)

(72) Inventors: Stijn Willem Boere, Eindhoven (NL); Aditya Mehendale, Geldrop (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 424 days.

(21) Appl. No.: 16/301,258

(22) PCT Filed: May 24, 2017

(86) PCT No.: PCT/EP2017/062545
§ 371 (c)(1),
(2) Date: Nov. 13, 2018

(87) PCT Pub. No.: WO2017/202913
PCT Pub. Date: Nov. 30, 2017

(65) Prior Publication Data
US 2019/0281968 A1     Sep. 19, 2019

Related U.S. Application Data

(60) Provisional application No. 62/340,608, filed on May 24, 2016.

(51) Int. Cl.
*A46B 15/00* (2006.01)
*A61C 17/22* (2006.01)

(52) U.S. Cl.
CPC ...... *A46B 15/0012* (2013.01); *A46B 15/0044* (2013.01); *A61C 17/221* (2013.01); *A46B 2200/1066* (2013.01)

(58) Field of Classification Search
CPC ............ A46B 15/0012; A46B 15/0044; A46B 2200/1066; A46B 9/04; A61C 17/221
See application file for complete search history.

(56) References Cited

U.S. PATENT DOCUMENTS 6,623,698 B2 *   9/2003   Kuo ................... A61B 10/0051
                                                             422/547
7,086,111 B2 *   8/2006   Hilscher .............. A61C 17/221
                                                             15/21.1

(Continued)

FOREIGN PATENT DOCUMENTS

| WO | 02071971 A1 | 9/2002 |
|---|---|---|
| WO | 2014098950 A1 | 6/2014 |
| WO | 2016174621 A1 | 11/2016 |

*Primary Examiner* — Dung Van Nguyen

(57) ABSTRACT

An oral cleaning device (10) for characterizing a position of a brush head of the device. The oral cleaning device includes: a body portion (12); a brush head (14) extending from the body portion, where at least a portion of the brush head is configured to move relative to the body portion; a controller (30); and an optical sensor (28) positioned relative to the brush head member and body portion and being in communication with the controller, where the optical sensor is configured to obtain optical sensor data resulting from a deflection or rotation of the brush head member relative to the body portion; the controller being configured to receive the optical sensor data and determine the deflection or rotation of the brush head member relative to the body portion.

7 Claims, 11 Drawing Sheets

(56) References Cited

U.S. PATENT DOCUMENTS

| | | |
|---|---|---|
| 8,393,037 B2 | 3/2013 | Iwahori et al. |
| 8,965,476 B2 | 2/2015 | Freeman et al. |
| 9,049,920 B2 | 6/2015 | De Vries et al. |
| 2012/0310593 A1 | 12/2012 | Bates et al. |
| 2016/0331119 A1* | 11/2016 | Schaefer ............... A61C 17/221 |
| 2016/0331120 A1* | 11/2016 | Scheele ................ A46B 5/0025 |

* cited by examiner

METHODS AND SYSTEMS FOR OPTICAL SENSING OF FORCES IN A TOOTHBRUSH

CROSS-REFERENCE TO PRIOR APPLICATIONS

This application is the U.S. National Phase application under 35 U.S.C. § 371 of International Application No. PCT/EP2017/062545, filed on May 24, 2017 which claims the benefit of U.S. Provisional Patent Application No. 62/340,608, filed on May 24, 2016. These applications are hereby incorporated by reference herein.

FIELD OF THE INVENTION

The present disclosure is directed generally to methods and systems for detecting and measuring the force exerted on a brush head of an oral cleaning device using an optical sensor.

BACKGROUND

Proper toothbrushing technique, including length and coverage of brushing, helps ensure long-term dental health. Many dental problems are experienced by individuals who either don't regularly brush their teeth or who do so inadequately. Among individuals who do regularly brush, improper brushing habits can result in poor coverage of brushing and thus surfaces that are not adequately cleaned.

Feedback mechanisms are one way to ensure proper toothbrushing technique. There are many feedback mechanisms designed to provide information to both the toothbrush and to users of oral cleaning devices about a brushing session. For example, known types of feedback include brushing force, such as whether the user is using too little or too much force, among others. These methods and techniques are intended to give feedback to the toothbrush so it can adjust one or more characteristics of the brush, such as brushing amplitude or frequency, and/or to provide feedback to the user so that they can improve their brushing technique.

To accomplish these methods and techniques, it is necessary to have one or more sensors in the oral cleaning device. One such sensor is a pressure sensor to determine the pressure applied by the user to the bristle head against the teeth and gums. Typically pressure sensors comprise a spring in combination with a Hall effect sensor to measure deflection of the brush head or driveshaft due to the brush forces exerted by the user. The deflection is a measure of the amount of force that the user applies on the toothbrush.

Accordingly, there is a continued need in the art for systems and methods of measuring movement of the brush head of an oral cleaning device in order to characterize the forces applied by the bristle head against the teeth and gums. For example, the forces may be conveniently inferred by measuring deflection of part of the brushing system.

SUMMARY OF THE INVENTION

The present disclosure is directed to inventive methods and systems for measuring the deflection and rotation of a portion of an oral cleaning device using an optical sensor, and utilizing that information to characterize the forces applied by the bristle head against the teeth and gums. Applied to a system configured to measure deflection and rotation with an optical sensor, the inventive methods and systems enable more accurate monitoring of the forces that the user applies during a brushing session. Measurement of deflection and rotation also allow for a determination of brush amplitude, which can be adjusted to optimum levels. For example, a brush amplitude which is too low results in insufficient cleaning of the teeth, while a brush amplitude which is too high might cause damage to the user's gum, excessive sound from the device, or failure of the device. The optimum amplitude, however, provides better teeth cleaning and results in minimum power consumption. Further, measurement of deflection and rotation also allows for characterization of the brush angle with regard to the teeth.

Generally in one aspect, an oral cleaning device is provided. The oral cleaning device includes: (i) a body portion; (ii) a brush head extending from the body portion, where at least a portion of the brush head is configured to move relative to the body portion; (iii) a controller; (iv) an optical sensor positioned relative to the brush head member and body portion and being in communication with the controller, the optical sensor configured to obtain optical sensor data resulting from a deflection or rotation of the brush head member relative to the body portion; and the controller being configured to receive the optical sensor data and determine the deflection or rotation of the brush head member relative to the body portion.

According to an embodiment, the optical sensor comprises a light source and a light sensor.

According to an embodiment, the optical sensor comprises a light source, a first light sensor positioned on one side of the light source, and a second light sensor positioned on a second side of the light source.

According to an embodiment, the optical sensor comprises a light sensor, a first light source positioned on one side of the light sensor, and a second light source positioned on a second side of the light sensor.

According to an embodiment, the optical sensor comprises a first portion positioned on the body portion and comprising a light source and a light sensor, and a second portion positioned on the brush head member and comprising a reflector.

According to an embodiment, the oral device further includes a pulse generator configured to generate a pulse or modulation pattern for light emitted by light source.

According to an aspect is an oral cleaning device. The device includes: an optical sensor; and a controller in communication with the optical sensor, where the controller is configured to: (i) receive, from the optical sensor, sensor information comprising information about a deflection and/or rotation of a brush head of the oral cleaning device; and (ii) calculate a position of the brush head relative to the brush body based on the information about the deflection and/or rotation of the brush head.

According to an embodiment, the controller is further configured to evaluate, using a plurality of calculated positions of the brush head, a brushing session.

According to an aspect is a method for characterizing a position of a brush head of an oral cleaning device. The method includes the steps of: providing the oral cleaning device comprising an optical sensor, a body portion, a brush head, and a controller; determining, by the optical sensor, sensor information comprising information about a deflection and/or rotation of the brush head; and calculating, by the controller, a position of the brush head relative to the brush body based on the information about the deflection and/or rotation of the brush head.

According to an embodiment, the method further includes the step of determining, from the calculated position of the brush head relative to the brush body, a force exerted on the brush head.

According to an embodiment, the method further includes the step of determining, from the calculated position of the brush head relative to the brush body, an angle of the brush head.

According to an embodiment, the method further includes the step of evaluating, using a plurality of calculated positions of the brush head, an efficacy measurement of the brushing session.

According to an embodiment, the method further includes the step of utilizing the calculated force exerted on or by the brush head to control an amplitude of brush head movement by the oral cleaning device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and system for measuring the deflection and rotation of a portion of an oral cleaning device using an optical sensor. More generally, Applicant has recognized and appreciated that it would be beneficial to provide a system to measure the deflection and rotation of a portion of the brush in order to characterize the forces applied by the bristle head against the teeth and gums. Accordingly, the methods described or otherwise envisioned herein provide an oral cleaning device configured to determine the deflection and rotation of a portion of the brush. According to an embodiment, the method utilizes an optical sensor to measure the deflection and rotation of a portion of the brush during a brushing session.

A particular goal of utilization of the embodiments and implementations herein is to characterize brushing forces using an oral cleaning device such as, e.g., a Philips Sonicare™ toothbrush (manufactured by Koninklijke Philips Electronics, N.V.).

Figure 1:
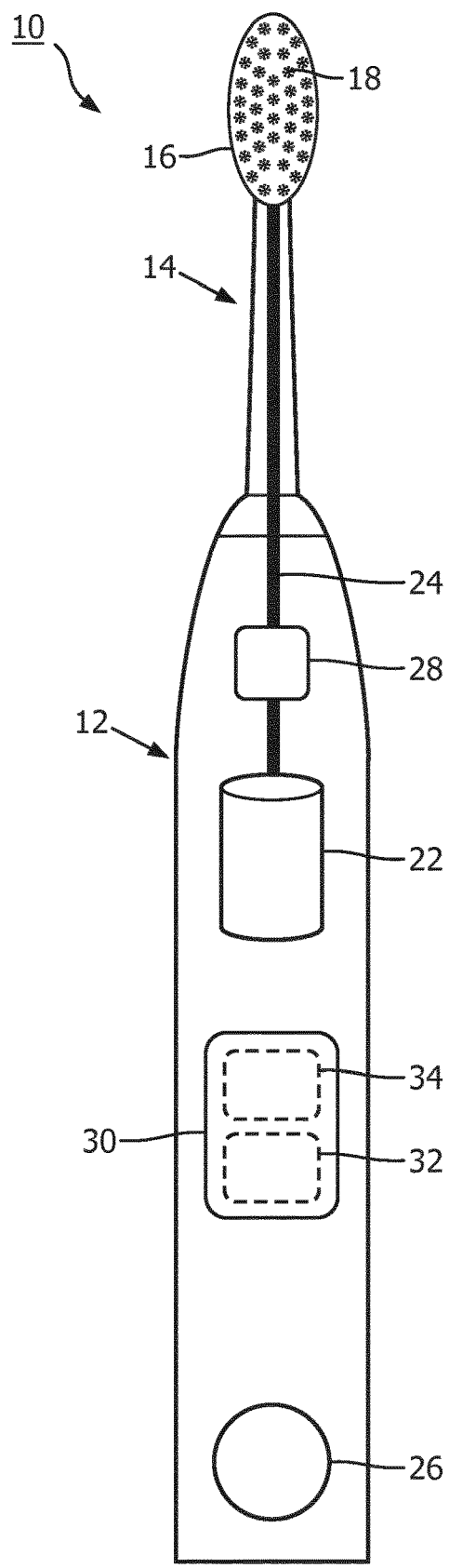
FIG. 1 is a representation of an oral cleaning device in accordance with an embodiment.

Referring to FIG. 1, in one embodiment, an oral cleaning device 10 is provided that includes a body portion 12 and a brush head member 14 mounted on the body portion. Brush head member 14 includes at its end remote from the body portion a brush head 16. Brush head 16 includes a bristle face 18, which provides a plurality of bristles. According to an embodiment, the bristles extend along an axis substantially perpendicular to the head's axis of elongation, although many other embodiments of the brush head and bristles are possible.

According to an embodiment, head member 14, brush head 16, and/or bristle face 18 are mounted so as to be able to move relative to the body portion 12. The movement can be any of a variety of different movements, including vibrations or rotation, among others. According to an embodiment, head member 14 is mounted to the body so as to be able to vibrate relative to body portion 12, or, as another example, brush head 16 is mounted to head member 14 so as to be able to vibrate relative to body portion 12. For example, in accordance with an embodiment, the bristles are vibrated at a first frequency that is equal to or greater than approximately 250 Hz, but many other frequencies, patterns, and vibrations are possible. The head member 14 can be fixedly mounted onto body portion 12, or it may alternatively be detachably mounted so that head member 14 can be replaced with a new one when the bristles or another component of the device are worn out and require replacement.

According to an embodiment, body portion 12 includes a drivetrain 22 for generating movement and a transmission component 24 for transmitting the generated movements to brush head member 14. For example, drivetrain 22 can comprise a motor or electromagnet(s) that generates movement of the transmission component 24, which is subsequently transmitted to the brush head member 14. Drivetrain 22 can include components such as a power supply, an oscillator, and one or more electromagnets, among other components. In this embodiment the power supply comprises one or more rechargeable batteries, not shown, which can, for example, be electrically charged in a charging holder in which oral cleaning device 10 is placed when not in use.

Although in the present embodiment the oral cleaning device 10 is an electric toothbrush, it will be understood that in an alternative embodiment the oral cleaning device is a manual toothbrush (not shown). In such an arrangement, the manual toothbrush has electrical components, but the brush head is not mechanically actuated by an electrical component.

Body portion 12 is further provided with a user input 26 to activate and de-activate movement generator 22. The user input 26 allows a user to operate the toothbrush 20, for example to turn the toothbrush 20 on and off. The user input 26 may, for example, be a button, touch screen, or switch.

Figure 2A:
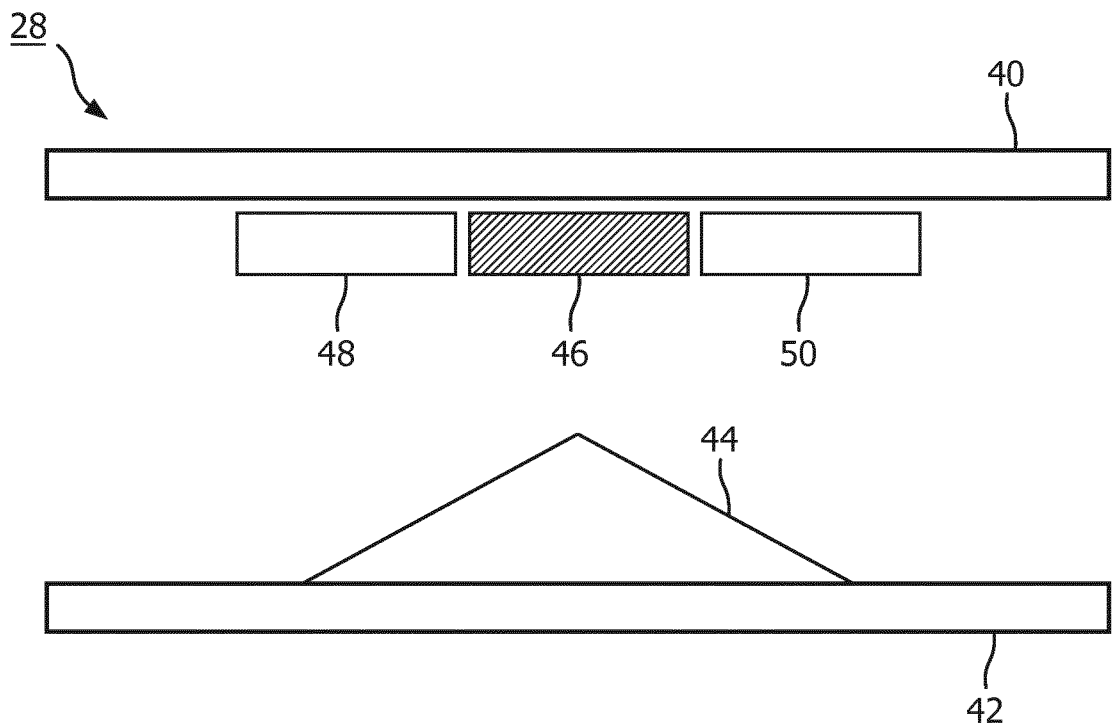
FIG. 2A is a schematic representation of an optical sensor in accordance with an embodiment.
Figure 2B:
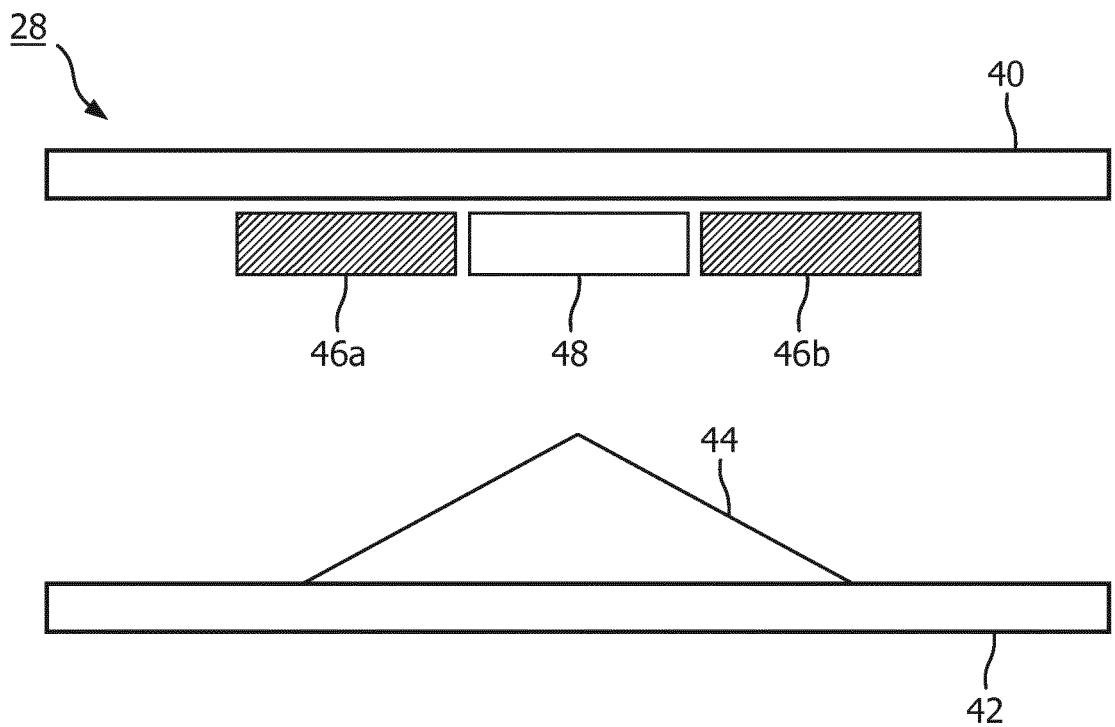
FIG. 2B is a schematic representation of an optical sensor in accordance with an embodiment.

According to an embodiment, the oral cleaning device 10 includes a pressure sensor 28. Pressure sensor 28 is shown in FIG. 1 within body portion 12, but may be located anywhere within the device, including for example within brush head member 14 or brush head 16. The pressure sensor 28 comprises, for example, an optical sensor. According to an embodiment as depicted in FIG. 2A, the optical sensor comprises a first portion 40 stably fixed to, mounted on, or part of the toothbrush. The first portion comprises a light source 46, and two light sensors 48 and 50 which can be separate from or integral with light source 46. The optical sensor also comprises a second portion 42 which is mounted to a flexible portion such as transmission component 24 for transmitting the generated movements to brush head member 14, or to a flexible portion within brush head member 14, or to brush head member 14. The second portion comprises a reflector 44. According to an embodiment depicted in FIG. 2B, the first portion comprises two light sources 46a and 46b, and a light sensor 48 which can be separate from or integral with one or more of two light sources 46a and 46b. In a scenario where the sensor 28 comprises a light source and two light sensors, the light sensors can be next to, opposite, or both next to and opposite the light source, for example. In a scenario where the sensor 28 comprises two light sources and a light sensor, the light sources can be next to, opposite, or both next to and opposite the light sensor, for example. Any configuration of the light sources and light sensors is possible.

According to another embodiment, the optical sensor comprises at least one light source 46 and at least one light sensor 48. This embodiment of the optical sensor also includes a light shield positioned at least partially between the light source and the light sensor such that a force exerted on the brush results in movement of at least one of the light source, the light sensor, and/or the light shield. This movement changes the amount of light received by the light sensor, which can be utilized to calculate or estimate force as described elsewhere herein. For example, the optical sensor 28 can be structured such that movement of the brush in a first direction moves the light shield from a first position to an at least partially non-shielding position, while movement in a second direction moves the light shield from a first position to an at least partially shielding position, among many other options. According to another embodiment, the optical sensor 28 can be structured such that movement of the brush in a first direction moves the light source with regard to the light sensor and the light shield. According to yet another embodiment, the optical sensor 28 can be structured such that movement of the brush in a first direction moves the light sensor with regard to the light source and the light shield.

Figure 3:
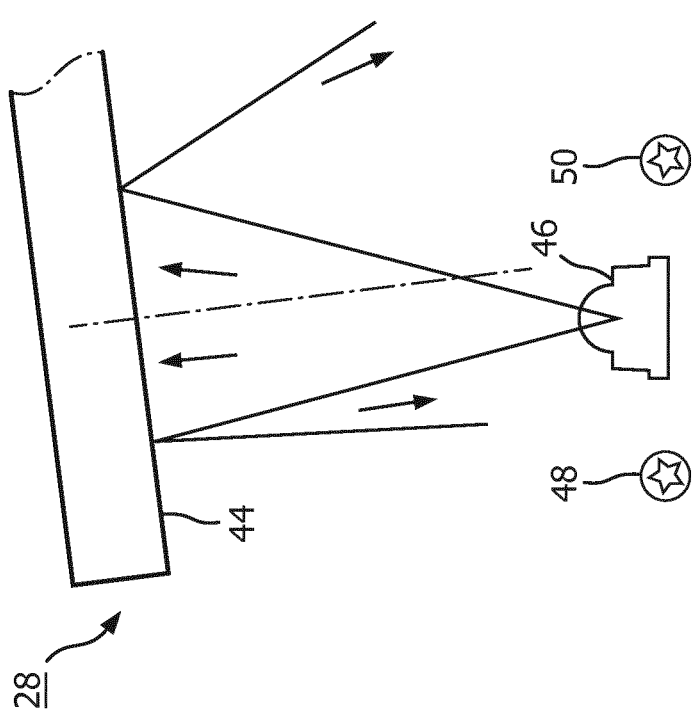
FIG. 3 is a schematic representation of an optical sensor in accordance with an embodiment.
Figure 3:
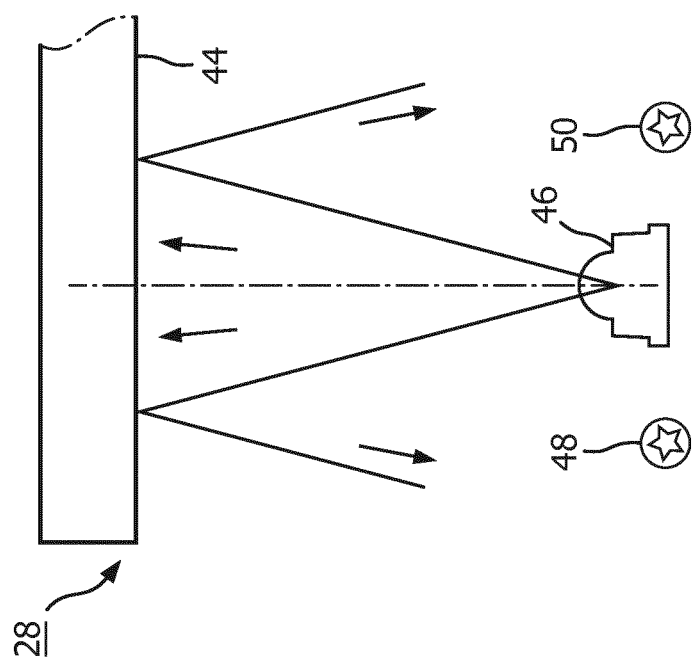
Figure 3:
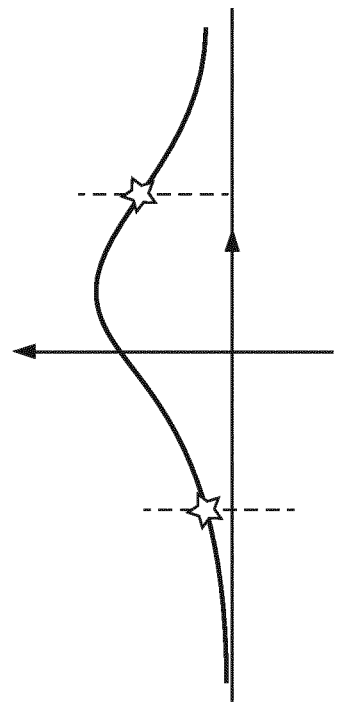
Figure 3:
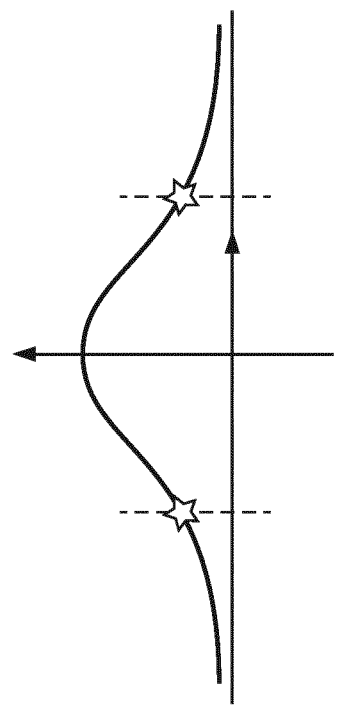
Figure 4:
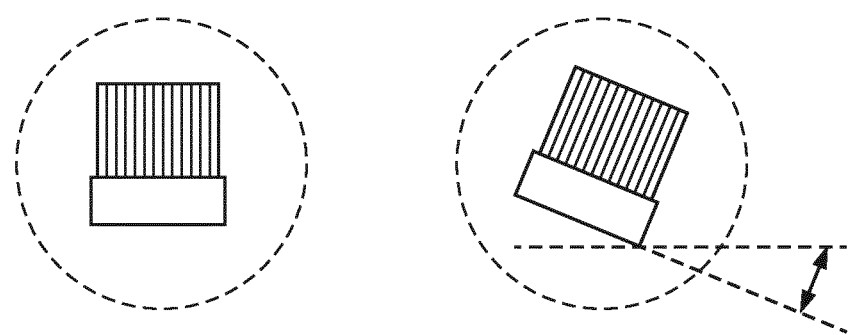
FIG. 4 is a schematic representation of rotation of the brush head of an oral cleaning device in accordance with an embodiment.

Referring to FIG. 3, in one embodiment, is a schematic representation of one method of operation of optical sensor 28. According to an embodiment, the light source 46 of the optical sensor may be, for example, one or more LEDs or other light sources. Light source 46 is configured to emit light which is reflected off of reflector 44 and detected by one or more of detectors 48 and 50. According to an embodiment, when the flexible portion of the toothbrush moves due to the vibration of the brush head or brush forces resulting from the user and a brushing session, the position of the reflector will change. In the right panel of FIG. 3, for example, the reflector has rotated due to a force exerted on the flexible portion. Rotation of the brush head is also depicted in FIG. 4. The movement of the brush head and thus the reflector causes a change in the intensity of the light detected by the light sensors 48 and 50, and/or causes a change in the reflection pattern detected by the light sensors 48 and 50. For example, the orientation and position of the reflector 44 can modulate the pattern of the reflected light, which can be detected and analyzed as described herein. In an embodiment with one each of light sensors 48 and 50 on each side of light source 46, a differential measurement allows for comparison of the left and right distribution of the light.

According to an embodiment, the information generated by optical sensor 28, such as the data obtained by one or more light sensors 48, is provided to a device controller 30. Controller 30 can comprise a processor 32 and a memory 34. The processor 32 may take any suitable form. For instance, processor 32 may be or include a microcontroller, plural microcontrollers, circuitry, a single processor, or plural processors. Controller 30 may be formed of one or multiple modules, and is operable to operate the oral cleaning device 10 in response to an input, for example user input 26. For example, controller 30 can be configured to actuate a motor control unit. According to an embodiment, the optical sensor 28 is integral to the controller 30.

The memory 34 can take any suitable form, including a non-volatile memory and/or RAM. The non-volatile memory may include read only memory (ROM), a hard disk drive (HDD) or a solid state drive (SSD). The memory can store, among other things, an operating system. The RAM is used by the processor for the temporary storage of data. The operating system may contain code which, when executed by controller 30, controls operation of each of the hardware components of the oral cleaning device 10.

Figure 5:
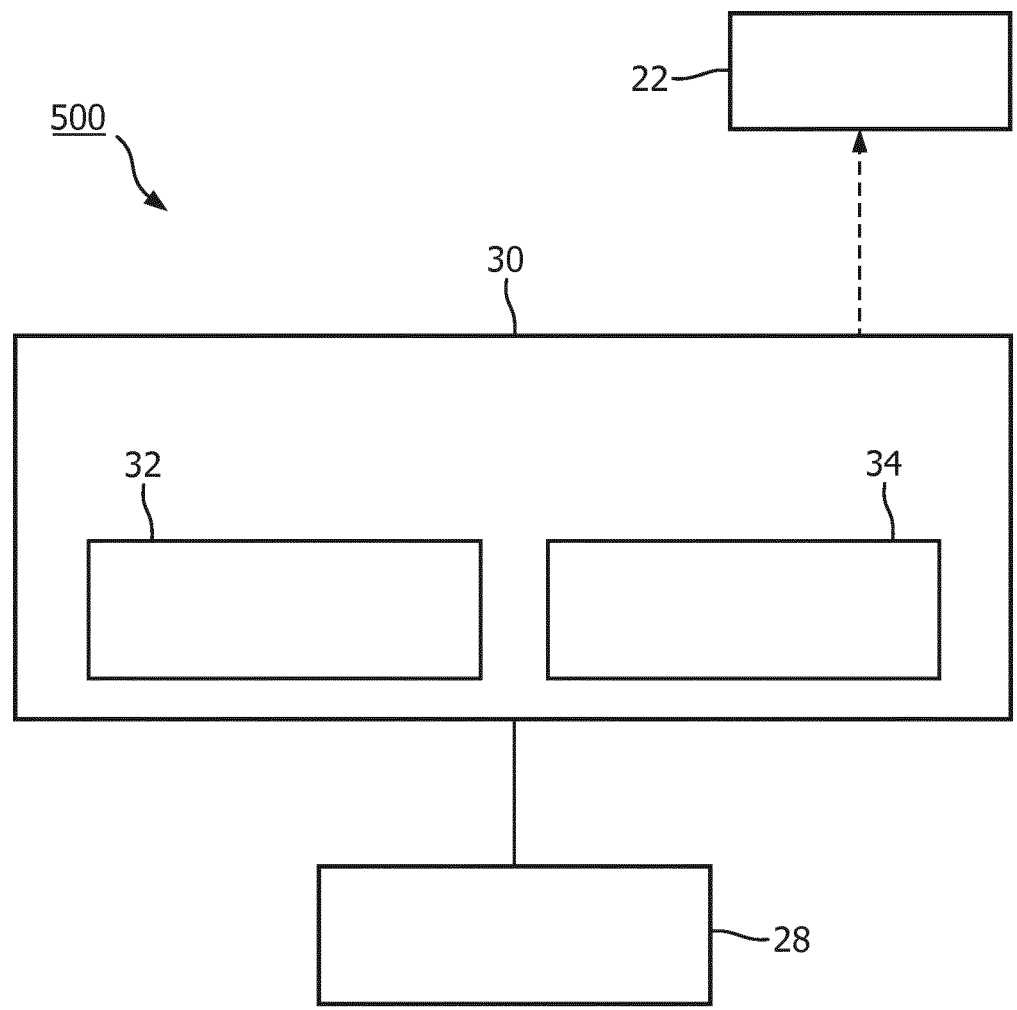
FIG. 5 is a schematic representation of an oral cleaning device control system in accordance with an embodiment.

Referring to FIG. 5, an embodiment of an oral cleaning system 500 is provided. According to an embodiment, oral cleaning system 500 includes one or more optical sensors 28 and a controller 30 comprising a processor 32 and a memory 34. When utilized with electric cleaning devices, the oral cleaning system 200 includes a drivetrain 22, the operation of which is controlled by controller 30.

Figure 6A:
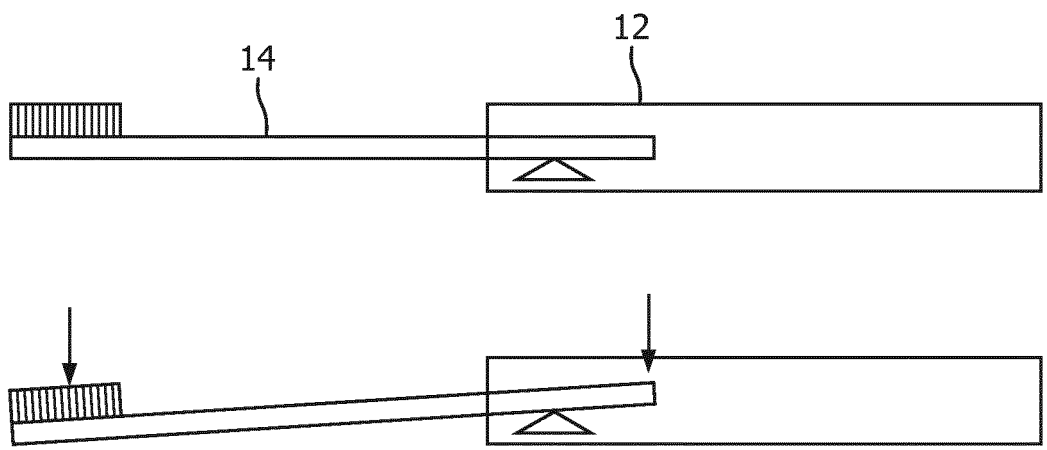
FIG. 6A is a schematic representation of normal deflection of an oral cleaning device in accordance with an embodiment.
Figure 6B:
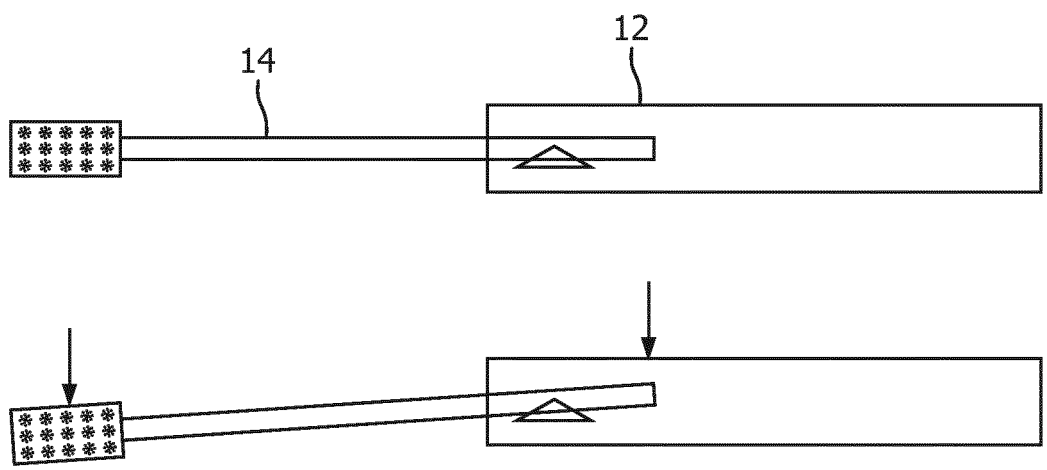
FIG. 6B is a schematic representation of lateral deflection of an oral cleaning device in accordance with an embodiment.

According to an embodiment, the controller 30 uses information from optical sensor 28 to characterize the normal deflection, lateral deflection, and/or rotation of the brush head relative to the brush body. The normal deflection of the brush head, depicted in FIG. 6A, is the application of force in the direction of the bristles of the brush head 16 on brush head member 14. Lateral deflection of the brush head relative to the brush body, depicted in FIG. 6B, is the application of force perpendicular to the direction of the bristles of the brush head 16 on brush head member 14. Rotation of the brush head, depicted in FIG. 4, is the rotation of the brush head 16 relative to the body 12 of the brush. According to an embodiment, controller 30 comprises a comparator or comparator module, a difference-amplifier or difference-amplifier module, a microprocessor, or a look-up table that is utilized to analyze the information from optical sensor 28 in order to characterize the forces being applied on the brush head based on the normal deflection, lateral deflection, and/or rotation of the brush head relative to the brush body. For example, the controller 30 may receive the information from optical sensor—such as a pattern of the received reflected light—and compare it to a database of stored patterns of received reflected light, which may be experimentally determined and/or pre-programmed. As another example, the controller 30 may receive the information from optical sensor—such as a pattern or the intensity of the received reflected light—and compare it to previously received information from the optical sensor in order to determine a change that corresponds to a position, deflection, rotation, and/or force of the brush head relative to the brush body. The device may utilize any method to translate the information from the light sensor or light sensors to a normal deflection, lateral deflection, and/or rotation of the brush head relative to the brush body, or to the force(s) applied by the user.

Figure 7:
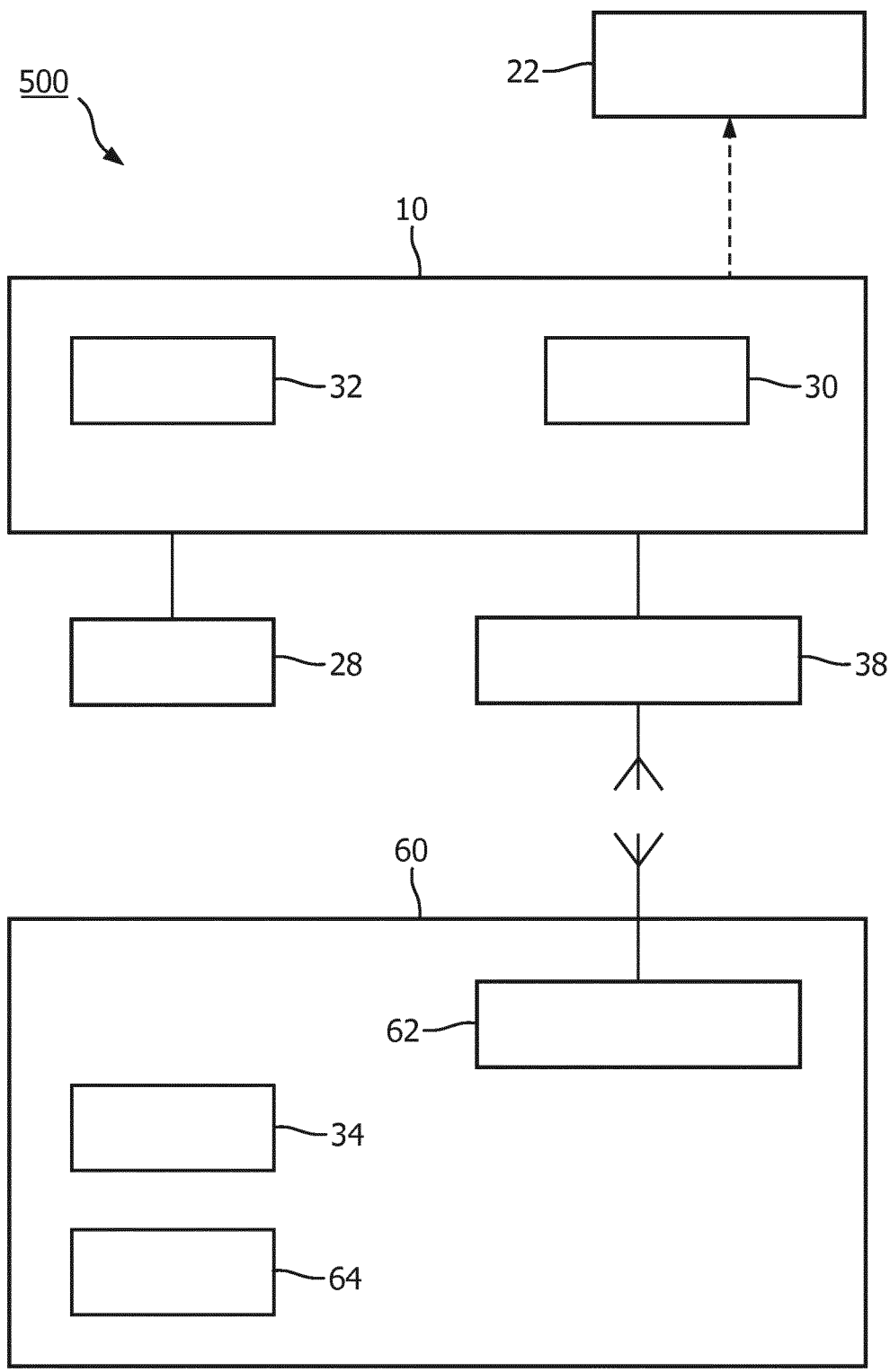
FIG. 7 is a schematic representation of an oral cleaning device control system in accordance with an embodiment.

Referring to FIG. 7 is another embodiment of an oral cleaning system 200 comprising an oral cleaning device 10 and a device 60 which is separate from the oral cleaning device. The oral cleaning device 10 can be any of the oral cleaning device embodiments disclosed or otherwise envisioned herein. According to an embodiment, oral cleaning device 10 includes one or more optical sensors 28 for pressure information, and a controller 30 comprising a processor 32. When utilized with electric cleaning devices, the oral cleaning device 10 includes a drivetrain 22, the operation of which is controlled by controller 30.

According to an embodiment, oral cleaning device 10 comprises a communications module 38 that transmits collected sensor information. The communications module can be any module, device, or means capable of transmitting a wired or wireless signal, including but not limited to a Wi-Fi, Bluetooth, near field communication, and/or cellular module.

According to an embodiment, device 60 can be any device configured to or capable of receiving and processing the sensor information transmitted from oral cleaning device 10. For example, device 10 may be a cleaning device holder or station, a smartphone, a computer, a server, or any other computerized device. According to an embodiment, device 60 includes a communications module 62 can be any module, device, or means capable of receiving a wired or wireless signal, including but not limited to a Wi-Fi, Bluetooth, near field communication, and/or cellular module. Device 60 also includes a processor 64 which uses the received light sensor information from optical sensor 28 to measure forces exerted by the user based on the detected and/or calculated deflection and/or rotation of the brush head relative to the brush body. According to one embodiment, device 60 may include memory 34 to store calibration data, received optical sensor information, or any other information.

As just one example, oral cleaning device 10 can collect sensor information using optical sensor 28 and transmit that information locally via a Bluetooth connection to a smartphone device 60, where the sensor information is processed and/or stored. As another example, oral cleaning device 10 can collect sensor information using optical sensor 28 and transmit that information via a WiFi connection to the Internet where it is communicated to a remote server device 60. The remote server device 60 processes and/or stores the sensor information. A user may access that information directly or may receive reports, updates, or other information from the remote server device 60 or an associated device.

Figure 8A:
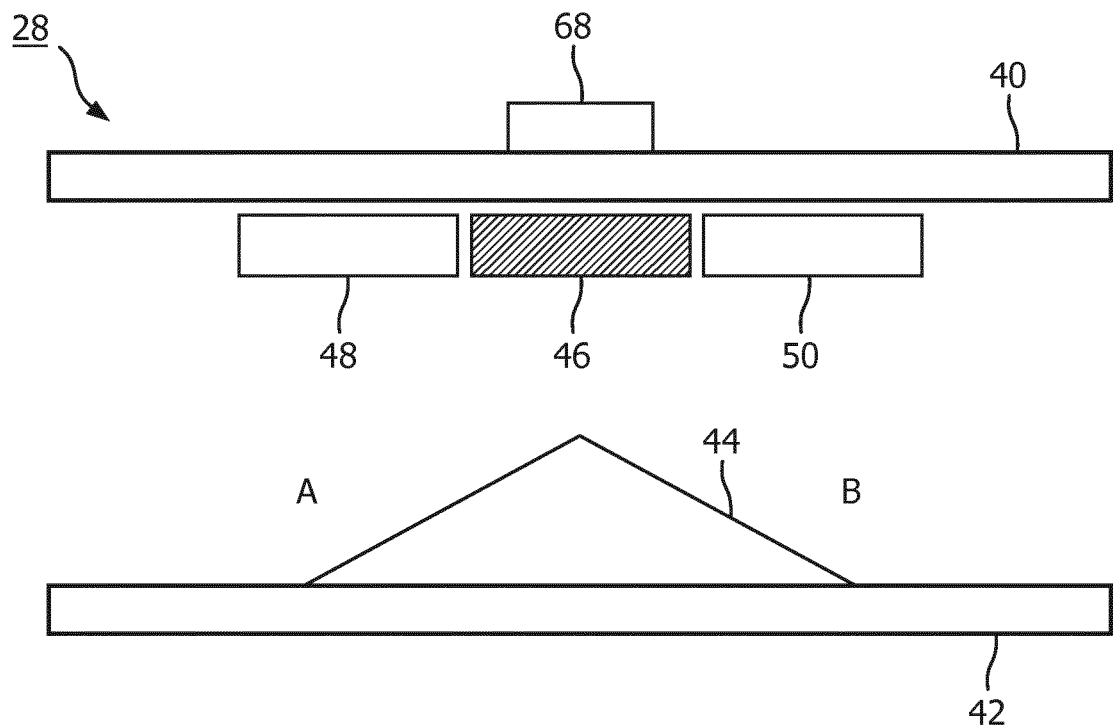
FIG. 8A is a schematic representation of an optical sensor in accordance with an embodiment.

Referring to FIG. 8A, in one embodiment, is a configuration of optical sensor 28 with side A and side B. Pursuant to this configuration, the intensity and distribution of light emitted by light source 46 as detected by light sensors 48 and 50 changes depending on the pose or positioning—including the deflection and/or rotation—of the brush head to which reflector 44 is mounted, affixed, or otherwise attached. By measuring these changes of the intensity and distribution of light, the pose or positioning of the reflector or brush head can be reconstructed and thereby the force that the user effectively applies to the brush head, and/or to the teeth or gums via the brush head, can be estimated.

According to an embodiment, using the reflected light at least three degrees of freedom of the reflector and/or brush head can be reconstructed. For example, to detect normal deflection, the addition of the reflected light on sides A and B (such as A+B) is proportional to the proximity of the reflector to the light sensors 48 and 50. In other words, when force is applied and reflector 44 is closer to light source 46 and light sensors 48 and 50, the intensity of the detected light is higher. When force is not applied or is applied at a lesser amount, reflector 44 is further away from light source 46 and light sensors 48 and 50, and the intensity of the detected light is lower.

To detect lateral deflection, the difference in reflected light on sides A and B (such as A-B or B-A) is proportional to the lateral displacement of the reflector 44. Thus, when reflector 44 is moved toward side A due to lateral displacement, the intensity of light detected by sensor 48 will be higher than the intensity of light detected by sensor 50. When reflector 44 is moved toward side B due to lateral displacement, the intensity of light detected by sensor 50 will be higher than the intensity of light detected by sensor 48.

To detect rotation, the difference in reflected light on sides A and B (such as A-B or B-A) is proportional to the rotation of the reflector 44. However, in some embodiments, lateral displacement and rotation are both proportional to the A-B or B-A signal. According to one embodiment, lateral displacement and rotation can be separated by their frequency content. For example, a low frequency (such as <10 Hz) component of the (A-B) signal will be proportional to the lateral displacement while the high frequency (such as >200 Hz) component of the (A-B) signal will be proportional to the rotation.

Figure 8B:
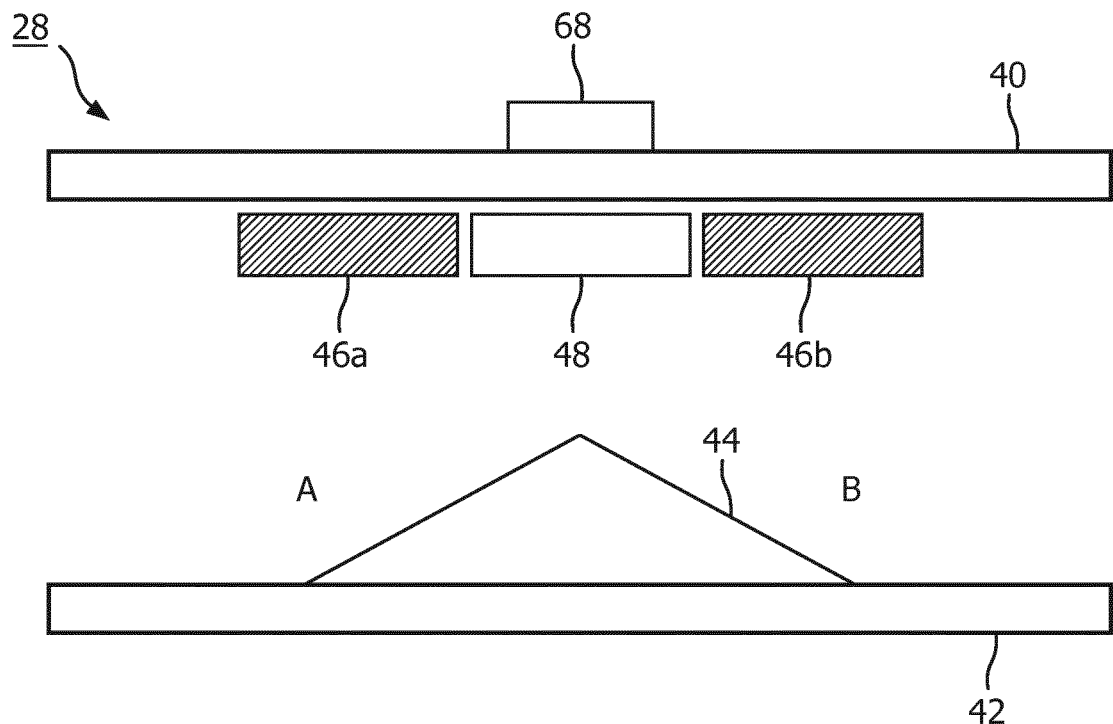
FIG. 8B is a schematic representation of an optical sensor in accordance with an embodiment.

According to another embodiment, as depicted in FIG. 8B, the optical sensor comprises two light sources 46a and 46b, one each on each side of light sensor 48. In this embodiment, light source 46a and 46b alternate pulses at a high frequency (such as >1 kHz), and the light sensor 48 measures the alternating reflected light from A and reflected light from B. This embodiment may, for example, reduce the cost price of the sensor. According to an embodiment a pulse generator 68 creates three different signals: (i) a pulse signal for light source 46a on side A; (ii) a pulse signal for light source 46b on side B; and (iii) a pulse signal for a background measurement.

Figure 9A:
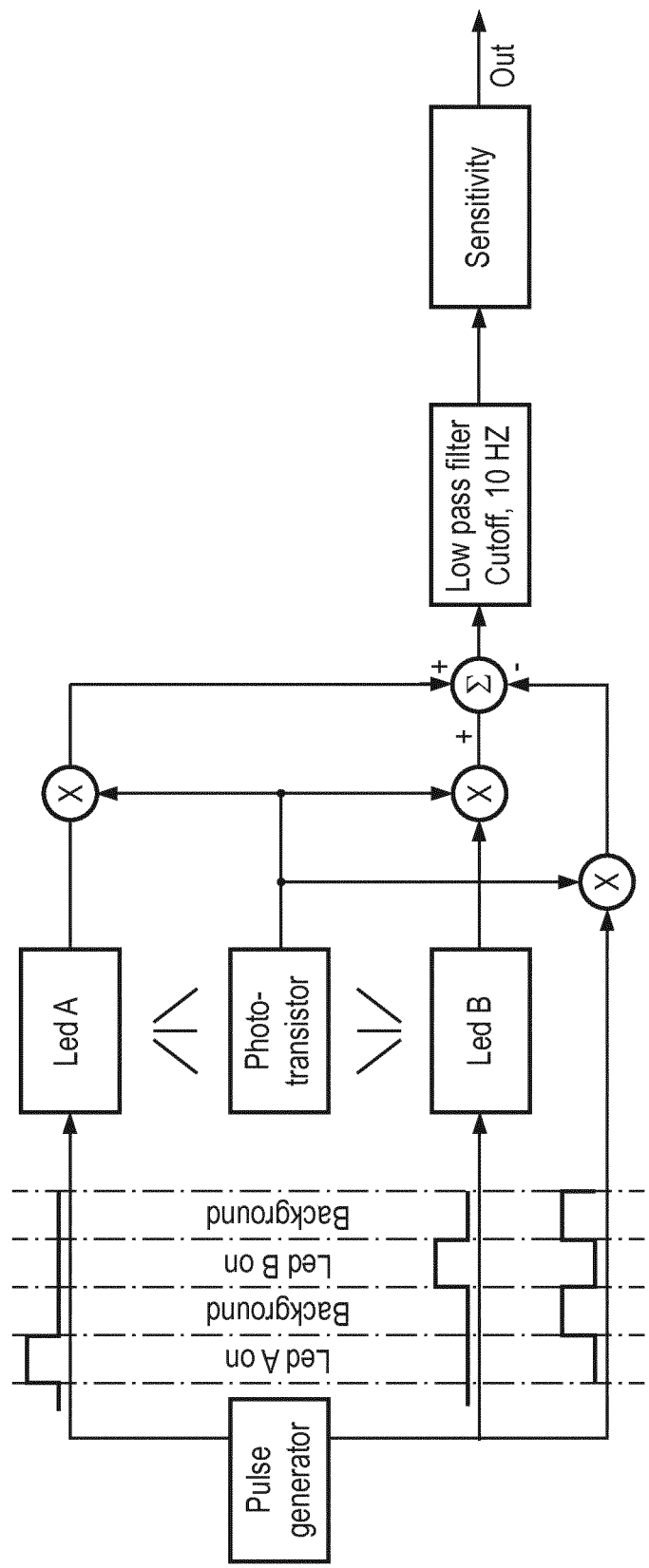
FIG. 9A schematic representation of a system for pulse generation, detection, and analysis in accordance with an embodiment.

Referring to FIG. 9A, in one embodiment, is a schematic illustrating a measurement of normal displacement utilizing the embodiment depicted in FIG. 8B. Pursuant to this embodiment, the light sensor 48 measures reflected light continuously. The measured output from the light sensor is multiplied with the excitation signal resulting in three different signals (A, B, and background). Subsequently, signals A and B are summed and the background signal is subtracted. This results in a bulk reflected light (A+B) signal which is proportional to the normal position of the reflecting target. According to an embodiment, in order to reduce the noise on the signal and to decrease the effect of high frequent rotation of the flexible mechanism, the A+B signal can be lowpass filtered (using, for example, a cutoff-frequency of 10 Hz) and converted in a force signal by means of a sensitivity gain or look-up table.

Figure 9B:
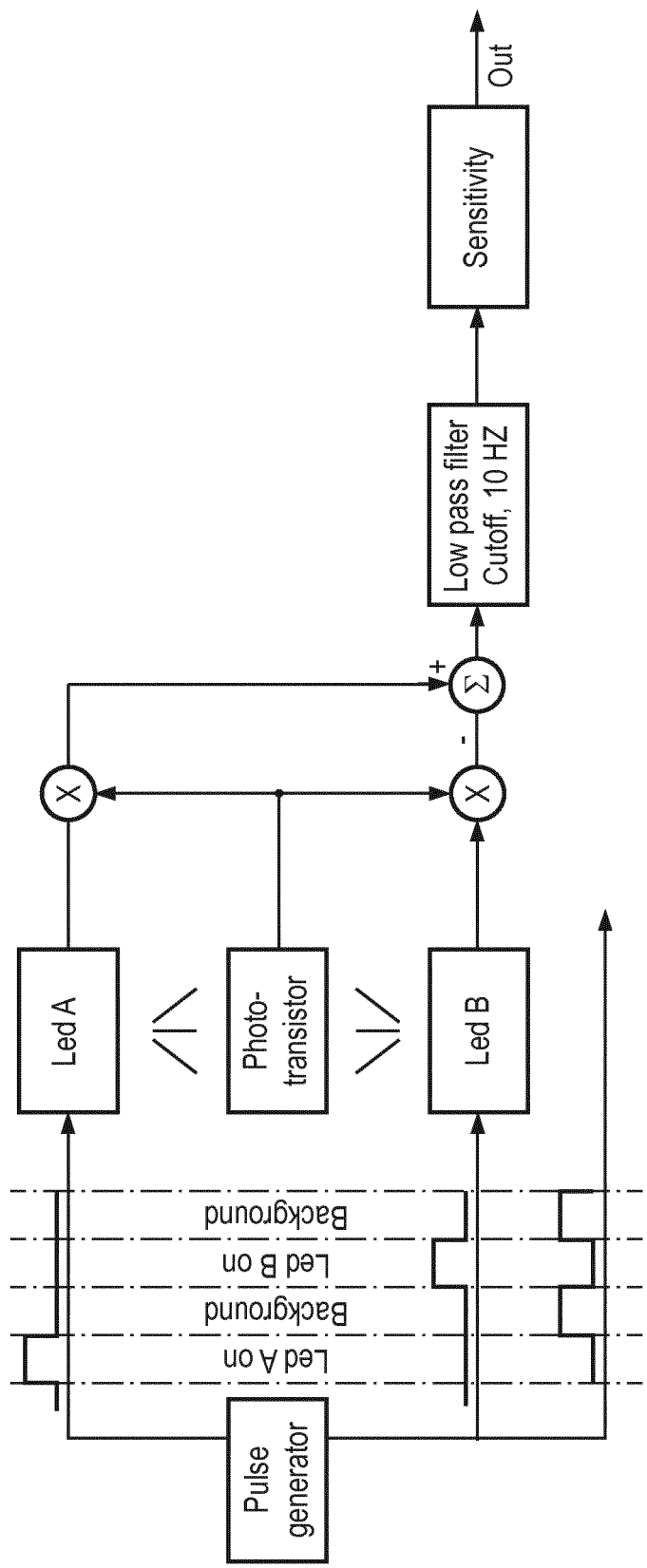
FIG. 9B schematic representation of a system for pulse generation, detection, and analysis in accordance with an embodiment.

Referring to FIG. 9B, in one embodiment, is a schematic illustrating a measurement of lateral displacement utilizing the embodiment depicted in FIG. 8B. Pursuant to this embodiment, the light sensor 48 measures reflected light continuously. The measured output from the light sensor is multiplied with the excitation signal resulting in three different signals (A, B, and background). Subsequently, the signals A and B are subtracted. In this case, the background signal is not needed since A-B is a differential measurement. The A-B signal is proportional to the lateral displacement of the reflecting target. According to an embodiment, in order to reduce the noise on the signal and to decrease the effect of high frequent rotation of the flexible mechanism, the A-B signal can be lowpass filtered (using, for example, a cut-off frequency 10 Hz) and converted in a force signal by means of a sensitivity gain or look-up table. According to one embodiment, the system can normalize the (A-B) signal with (A+B) which will reduce the effects of normal deflection on the measurement of the lateral deflection.

Figure 9C:
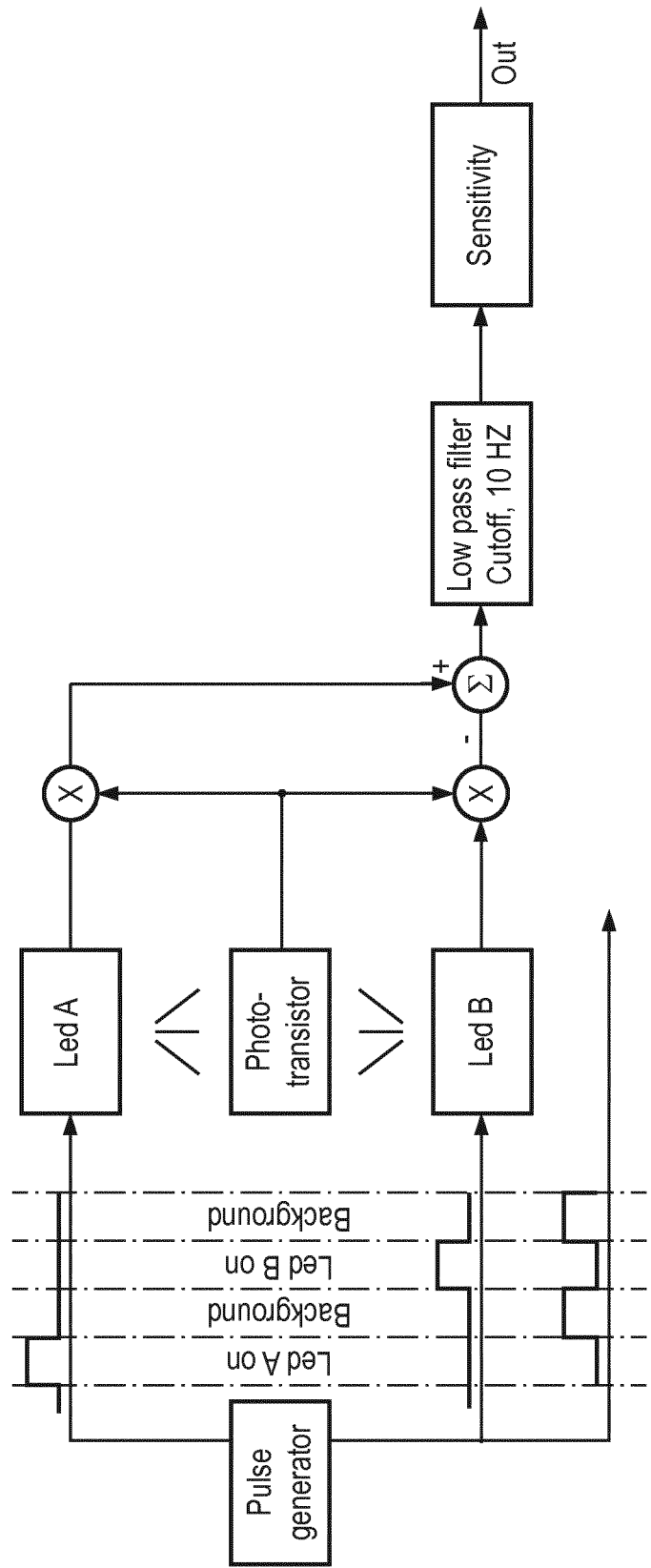
FIG. 9C schematic representation of a system for pulse generation, detection, and analysis in accordance with an embodiment.

Referring to FIG. 9C, in one embodiment, is a schematic illustrating a measurement of rotation utilizing the embodiment depicted in FIG. 8B. Pursuant to this embodiment, the light sensor 48 measures reflected light continuously. The measured output from the light sensor is multiplied with the excitation signal resulting in three different signals (A, B, and background). Subsequently, the signals A and B are subtracted. In this case, the background signal is not needed since A-B is a differential measurement. The A-B signal is proportional to the rotation of the reflecting target. To distinguish between lateral displacement of the target and rotation the A-B signal is band pass filter (passband, typically 50-500 Hz) to filter out the low frequent lateral displacement and high frequent pulsing frequency. Subsequently, the filtered signal is converted in a rotation signal by means of a sensitivity gain or look-up table. According to one embodiment, the system can normalize the (A-B) signal with (A+B) which will reduce the effects of normal deflection on the measurement of the lateral deflection.

In addition the embodiments described above, many other embodiments are possible and envisioned herein. For example, while embodiments with one light source and two light sensors, and embodiments with two light sources and one light sensor are described, any combination of light source and light sensor may be utilized. For example, the system may comprise a third light source and/or a third light sensor to further reduce crosstalk between various displacements or rotations. As yet another embodiment, the exact shape of the reflective surface might be optimized to increase reflectivity and reduce the crosstalk between different directions. According to another embodiment, the analysis and/or data processing required to determine the position of the brush head might be part of the optical sensor itself, or might be part of the processor or controller of either the oral cleaning device or a separate device such as a base station or mobile device.

Figure 10:
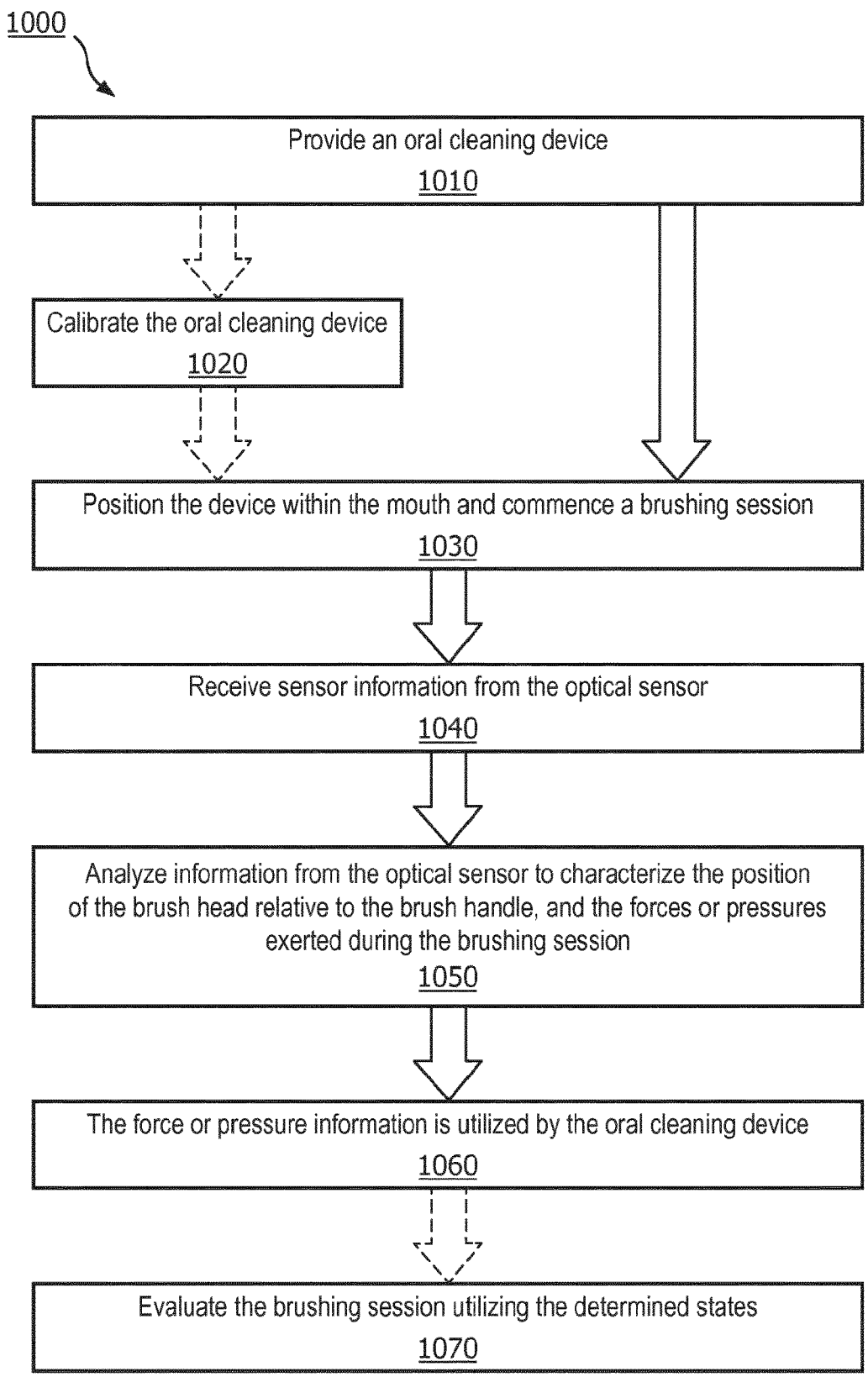
FIG. 10 is a flowchart depicting a method for detecting deflection and rotation of a brush head by an optical sensor in accordance with an embodiment.

Referring to FIG. 10, in one embodiment, is a flowchart of a method 1000 for measuring the deflection and rotation of the brush head relative to the brush body of an oral cleaning device using an optical sensor. At step 1010 of the method, an oral cleaning device 10 is provided. The oral cleaning device can be any of the embodiments described or otherwise envisioned herein. For example, according to one embodiment, oral cleaning device 10 includes a body portion 12, a brush head member 14 with a bristle face 18, an optical sensor 28, and a controller 30 with processor 32 and memory 34. Many other embodiments of the oral cleaning device 10 are also possible.

At optional step 1020 of the method, the system 500 can be calibrated. The calibration can comprise, for example, defining relationships between light intensities and/or patterns and forces exerted on the brush or brush head, which can be done at the factory or by the user. During a calibration session, for example, a force can be exerted on the brush and the instantaneous sensor data is annotated and stored. According to an embodiment, the calibration step is omitted. Instead, the oral cleaning device develops a calibration data set over one or more brushing sessions by comparing data between those sessions. A self-learning method could also be utilized to supplement, amend, or otherwise adjust a factory or user calibration.

At step 1030 of the method, the oral cleaning device is positioned within the mouth at a first location, and the user starts brushing his teeth. During the brushing session, both deflection and rotation forces are exerted on the brush head which can be detected and characterized by the device.

At step 1040 of the method, light source or sources 46 omit light, which may be pulsed or patterned according to the embodiments described or otherwise envisioned herein, and light sensor 48 or light sensors 48 and 50 detect the omitted light. Typically, the optical sensor will gather data throughout the entirety of a brushing session. However, in some embodiments the optical sensor may only periodically gather data, or data from the optical sensor may only be obtained by the controller or other component periodically. Accordingly, the sampling rate or frequency of the optical sensor can vary considerably. As the user exerts pressure on the oral cleaning device, the brush head will move in one or more directions and the light intensity and/or pattern detected by the light sensor(s) will vary. As described or otherwise envisioned herein, the varying light intensity and/or pattern can be analyzed to determine the deflection and rotation of the brush head relative to the brush handle.

At step 1050, the controller or processor receives the data from the light sensor and interprets the data to determine the deflection and rotation of the brush head, and thereby determine the brush angle and pressure. For example, controller 30 can comprise a comparator or comparator module, a difference-amplifier or difference-amplifier module, a microprocessor, or a look-up table that is utilized to analyze the information from optical sensor 28 in order to characterize the forces being applied on the brush head based on the normal deflection, lateral deflection, and/or rotation of the brush head. For example, the controller 30 may receive the information from optical sensor—such as a pattern of the received reflected light—and compare it to a database of stored patterns of received reflected light, which may be experimentally determined and/or pre-programmed. As another example, the controller 30 may receive the information from optical sensor—such as a pattern or the intensity of the received reflected light—and compare it to previously received information from the optical sensor in order to determine a change that corresponds to a position, deflection, rotation, and/or force of the brush head. The device may utilize any method to translate the information from the light sensor or light sensors to a normal deflection, lateral deflection, and/or rotation of the brush head, or to the force(s) applied by the user.

Pursuant to the embodiment of system 500 depicted in FIG. 7, for example, the data from the light sensor may be communicated to device 60, which can be any device configured to or capable of receiving and processing the sensor information transmitted from oral cleaning device 10. The controller or processor of device 60 may then interpret or analyze the data to determine the deflection and rotation of the brush head. As yet another embodiment, an interpretation of the sensor data from the optical sensor may be interpreted or analyzed by the oral cleaning device, and the interpretation or analysis can be communicated to device 60.

Once the brush angle and pressure is characterized, the oral cleaning device can utilize that information for a variety of downstream applications, system modifications, or other uses. For example, at step 1060 of the method in FIG. 10, the oral cleaning device utilizes the calculated brush angle and pressure to control the amplitude of the brush oscillation by varying the current to the motor, thereby preventing the damage to user's gums. As another example, the oral cleaning device can utilize the information to control the brush speed or amplitude to obtain an optimum speed or amplitude, thereby minimizing battery consumption and maximizing brushing efficacy.

At optional step 1070, a plurality of the determined brush angles and/or pressures are utilized to evaluate or measure the efficacy measurement of the brushing session. According to an embodiment, the system stores information about the brush angles and/or pressures obtained during a brushing session in order to create or otherwise perform the evaluation, either now or at some point in the future. According to another embodiment, the system stores information about multiple brushing sessions to accumulate data over time, including improvement in brushing times, technique, or other metric, as well as lack of improvement. For example, the system could utilize evaluation metrics that compare that to optimum brush angles and/or pressures. According to an embodiment, the system can utilize multiple metrics to evaluate a brushing session in a multi-dimensional manner According to an embodiment, the evaluation of the brushing session can be communicated. This could be performed utilizing a display that indicates whether too little pressure is being applied, just the right amount of pressure is being applied, or too much pressure is being applied. Alternatively, the display may indicate that the angle of the brush is correct or incorrect. According to an embodiment, the system can provide real-time data to a user or to a remote system. For example, the system can transmit real-time data to a computer via a wired or wireless network connection. As another example, the system can transmit stored data to a computer via a wired or wireless network connection. Thus, the system could transmit information about a single brushing session and/or multiple brushing sessions directly to a healthcare professional such as a dentist or dental hygienist.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one op" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An oral cleaning device comprising:
   a body portion;
   a brush head member extending from the body portion, wherein at least a portion of the brush head member is configured to move relative to the body portion;
   a controller;
   an optical sensor positioned relative to the brush head member and body portion and being in communication with the controller, wherein the optical sensor is configured to obtain optical sensor data resulting from a deflection or rotation of the brush head member relative to the body portion;
   wherein the controller is configured to receive the optical sensor data and determine the deflection or rotation of the brush head member relative to the body portion;
   wherein the optical sensor comprises a first portion positioned on the body portion and a second portion positioned on the brush head member and comprising a reflector; and
   (i) the first portion comprises a light source, a first light sensor positioned on one side of the light source, and a second light sensor positioned on a second side of the light source; or
   (ii) the first portion comprises a light sensor, a first light source positioned on one side of the light sensor, and a second light source positioned on a second side of the light sensor.

2. The oral cleaning device of claim 1, further comprising a pulse generator configured to generate a pulse or modulation pattern for light emitted by light source.

3. A method for characterizing a position of a brush head member of an oral cleaning device, the method comprising the steps of:
   providing the oral cleaning device comprising an optical sensor, a body portion, a brush head member, and a controller, wherein the optical sensor comprises a first portion positioned on the body portion and a second portion positioned on the brush head member and comprising a reflector and (i) the first portion comprises a light source, a first light sensor positioned on one side of the light source, and a second light sensor positioned on a second side of the light source; or (ii) the first portion comprises a light sensor, a first light source positioned on one side of the light sensor, and a second light source positioned on a second side of the light sensor;
   determining, by the optical sensor, sensor information comprising information about a deflection and/or rotation of the brush head member; and
   calculating, by the controller, a position of the brush head member relative to the brush body based on the information about the deflection and/or rotation of the brush head member.

4. The method of claim 3, further comprising the step of determining, from the calculated position of the brush head member relative to the brush body, a force exerted on the brush head member.

5. The method of claim 4, further comprising the step of utilizing the calculated force exerted on or by the brush head member to control an amplitude of brush head movement by the oral cleaning device.

6. The method of claim 3, further comprising the step of determining, from the calculated position of the brush head member relative to the brush body, an angle of the brush head member.

7. The method of claim 3, further comprising the step of evaluating, using a plurality of calculated positions of the brush head member, an efficacy measurement of the brushing session.

* * * * *